(12) United States Patent
Abraham et al.

(10) Patent No.: US 9,354,900 B2
(45) Date of Patent: May 31, 2016

(54) METHOD AND APPARATUS FOR PRESENTING A WINDOW IN A SYSTEM HAVING TWO OPERATING SYSTEM ENVIRONMENTS

(75) Inventors: Binu Abraham, Round Lake, IL (US); Joshua D. Galicia, Cary, IL (US); Tae Jin Kim, San Diego, CA (US); Andrew N. Tzakis, Vernon Hills, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 195 days.

(21) Appl. No.: 13/096,262

(22) Filed: Apr. 28, 2011

(65) Prior Publication Data

US 2012/0278750 A1    Nov. 1, 2012

(51) Int. Cl.
*G06F 3/048* (2013.01)
*G06F 9/44* (2006.01)
*G06F 9/455* (2006.01)

(52) U.S. Cl.
CPC .............. *G06F 9/4443* (2013.01); *G06F 9/455* (2013.01)

(58) Field of Classification Search
USPC ........................................................ 715/779
See application file for complete search history.

(56) References Cited

U.S. PATENT DOCUMENTS

| | | | |
|---|---|---|---|
| 5,119,494 A * | 6/1992 | Garman ........................ | 711/202 |
| 5,446,904 A | 8/1995 | Belt et al. | |
| 5,592,657 A | 1/1997 | Johnson et al. | |
| 5,757,371 A | 5/1998 | Oran et al. | |
| 5,828,376 A | 10/1998 | Solimene et al. | |
| 6,043,816 A | 3/2000 | Williams et al. | |
| 6,133,915 A | 10/2000 | Arcuri et al. | |
| 6,167,425 A | 12/2000 | Beckhoff | |
| 6,170,045 B1 | 1/2001 | Bobak et al. | |
| 6,178,503 B1 | 1/2001 | Madden et al. | |
| 6,205,452 B1 | 3/2001 | Warmus et al. | |
| 6,215,490 B1 | 4/2001 | Kaply | |

(Continued)

FOREIGN PATENT DOCUMENTS

| | | |
|---|---|---|
| CN | 101025701 A | 8/2007 |
| CN | 101051282 A | 10/2007 |

(Continued)

OTHER PUBLICATIONS

"EGL 1.0 Specification" published Jul. 23, 2003.*

(Continued)

*Primary Examiner* — Peiyong Weng
(74) *Attorney, Agent, or Firm* — McDermott Will & Emery LLP

(57) ABSTRACT

A device (110) and method (700) for providing windows in a multi-environment operating system is provided. A first operating system environment (first OSE) (222) is executed in a native mode on a mobile device (110). The mobile device comprises a first graphical user interface (GUI) 112. The first OSE generates graphical data for a first OSE window (118). The first OSE window can be used on the first GUI for interfacing with the first OSE. A second operating system environment (second OSE) (224) is executed in a native mode on the mobile device, wherein the second OSE generates a GUI desktop (318) that is displayed on a second GUI (312). A second window (320) is rendered on the GUI desktop that comprises the first OSE window. The second OSE communicates relevant events to the first OSE, which are used by the first OSE to update the information used to render the first OSE window within the second OSE window.

18 Claims, 10 Drawing Sheets

(56) References Cited

U.S. PATENT DOCUMENTS

| | | |
|---|---|---|
| 6,336,120 B1 | 1/2002 | Noddings et al. |
| 6,336,146 B1 | 1/2002 | Burridge et al. |
| 6,338,149 B1 | 1/2002 | Ciccone, Jr. et al. |
| 6,460,136 B1 | 10/2002 | Krohmer et al. |
| 6,571,282 B1 | 5/2003 | Bowman-Amuah |
| 6,691,146 B1 | 2/2004 | Armstrong et al. |
| 6,710,788 B1 | 3/2004 | Freach et al. |
| 6,757,002 B1 | 6/2004 | Oross et al. |
| 6,763,458 B1 | 7/2004 | Watanabe et al. |
| 7,114,104 B1 | 9/2006 | Bennett |
| 7,328,333 B2 | 2/2008 | Kawano et al. |
| 7,363,128 B2 | 4/2008 | Dietsch et al. |
| 7,424,601 B2 | 9/2008 | Xu |
| 7,424,623 B2 | 9/2008 | Du et al. |
| 7,461,144 B1 | 12/2008 | Beloussov et al. |
| 7,468,729 B1 | 12/2008 | Levinson |
| 7,523,738 B2 | 4/2009 | Ruiz |
| 7,529,921 B2 | 5/2009 | Stein et al. |
| 7,533,101 B2 | 5/2009 | Bond et al. |
| 7,536,537 B2 | 5/2009 | Linn |
| 7,590,945 B2 | 9/2009 | Sims et al. |
| 7,595,810 B2 | 9/2009 | Louch |
| 7,634,770 B2 | 12/2009 | Roth |
| 7,636,586 B2 | 12/2009 | Maaniitty |
| 7,681,134 B1 | 3/2010 | Grechishkin et al. |
| 7,689,820 B2 | 3/2010 | Pierce et al. |
| 7,783,665 B1 | 8/2010 | Tormasov et al. |
| 7,882,274 B2 | 2/2011 | Peterson |
| 7,975,236 B1 | 7/2011 | Grechishkin et al. |
| 8,046,570 B2 | 10/2011 | King et al. |
| 8,177,554 B2 | 5/2012 | Krasner |
| 8,195,624 B2 | 6/2012 | Yang |
| 8,261,231 B1 | 9/2012 | Hirsch et al. |
| 8,307,177 B2 | 11/2012 | Prahlad et al. |
| 8,352,733 B2 | 1/2013 | Mantere et al. |
| 8,392,498 B2 | 3/2013 | Berg et al. |
| 8,396,807 B1 | 3/2013 | Yemini et al. |
| 8,448,251 B2 | 5/2013 | Harris et al. |
| 8,589,952 B2 | 11/2013 | Wong et al. |
| 8,661,360 B2 | 2/2014 | Jeong et al. |
| 8,868,899 B2 | 10/2014 | Galicia et al. |
| 8,957,905 B2 | 2/2015 | Reeves et al. |
| 8,983,536 B2 | 3/2015 | Gangam et al. |
| 2001/0035882 A1 | 11/2001 | Stoakley et al. |
| 2002/0078260 A1 | 6/2002 | Hart et al. |
| 2002/0140742 A1 | 10/2002 | Lection |
| 2002/0151334 A1 | 10/2002 | Sharma |
| 2002/0157001 A1 | 10/2002 | Huang et al. |
| 2003/0065738 A1 | 4/2003 | Yang et al. |
| 2003/0135771 A1 | 7/2003 | Cupps et al. |
| 2003/0204708 A1 | 10/2003 | Hulme et al. |
| 2003/0221087 A1 | 11/2003 | Nagasaka |
| 2004/0015966 A1 | 1/2004 | MacChiano et al. |
| 2004/0039950 A1 | 2/2004 | Okamoto et al. |
| 2004/0061723 A1 | 4/2004 | Tai et al. |
| 2004/0066414 A1 | 4/2004 | Czerwinski et al. |
| 2004/0095388 A1 | 5/2004 | Rocchetti et al. |
| 2004/0111644 A1 | 6/2004 | Saunders et al. |
| 2004/0148375 A1 | 7/2004 | Levett et al. |
| 2004/0205755 A1* | 10/2004 | Lescouet et al. .............. 718/100 |
| 2004/0207508 A1 | 10/2004 | Lin et al. |
| 2005/0086650 A1 | 4/2005 | Yates et al. |
| 2005/0108297 A1 | 5/2005 | Rollin et al. |
| 2005/0125739 A1 | 6/2005 | Thompson et al. |
| 2005/0229188 A1 | 10/2005 | Schneider |
| 2005/0240756 A1 | 10/2005 | Mayer |
| 2005/0240763 A9 | 10/2005 | Bhat et al. |
| 2005/0246505 A1 | 11/2005 | McKenney et al. |
| 2005/0268078 A1 | 12/2005 | Zimmer et al. |
| 2006/0005187 A1 | 1/2006 | Neil |
| 2006/0010314 A1 | 1/2006 | Xu |
| 2006/0010446 A1 | 1/2006 | Desai et al. |
| 2006/0026274 A1 | 2/2006 | Cho et al. |
| 2006/0046706 A1 | 3/2006 | Lin et al. |
| 2006/0146057 A1 | 7/2006 | Blythe |
| 2006/0224989 A1 | 10/2006 | Pettiross et al. |
| 2006/0225107 A1 | 10/2006 | Seetharaman et al. |
| 2006/0253706 A1 | 11/2006 | Roberts et al. |
| 2007/0050765 A1 | 3/2007 | Geisinger |
| 2007/0128899 A1 | 6/2007 | Mayer |
| 2007/0135043 A1 | 6/2007 | Hayes et al. |
| 2007/0150842 A1 | 6/2007 | Chaudhri et al. |
| 2007/0162298 A1 | 7/2007 | Melton et al. |
| 2007/0180398 A1 | 8/2007 | McArdle |
| 2007/0192329 A1 | 8/2007 | Croft et al. |
| 2007/0198656 A1 | 8/2007 | Mazzaferri et al. |
| 2007/0226647 A1 | 9/2007 | Louch |
| 2007/0266231 A1 | 11/2007 | Chua |
| 2007/0283147 A1 | 12/2007 | Fried et al. |
| 2007/0288941 A1 | 12/2007 | Dunshea et al. |
| 2007/0294689 A1 | 12/2007 | Garney |
| 2008/0028326 A1 | 1/2008 | Wilson et al. |
| 2008/0034318 A1 | 2/2008 | Louch et al. |
| 2008/0082815 A1 | 4/2008 | Kawano et al. |
| 2008/0100568 A1 | 5/2008 | Koch et al. |
| 2008/0114844 A1 | 5/2008 | Sanchez et al. |
| 2008/0162983 A1 | 7/2008 | Baba et al. |
| 2008/0256468 A1 | 10/2008 | Peters et al. |
| 2008/0270910 A1 | 10/2008 | Lukasik et al. |
| 2008/0276195 A1 | 11/2008 | Moromisato et al. |
| 2008/0282205 A1 | 11/2008 | Dykstra-Erickson et al. |
| 2008/0307350 A1 | 12/2008 | Sabatelli et al. |
| 2008/0307360 A1 | 12/2008 | Chaudhri et al. |
| 2009/0031329 A1 | 1/2009 | Kim |
| 2009/0037909 A1 | 2/2009 | Xu |
| 2009/0063845 A1 | 3/2009 | Lin |
| 2009/0064186 A1 | 3/2009 | Lin |
| 2009/0080562 A1 | 3/2009 | Franson |
| 2009/0089569 A1 | 4/2009 | Baribault et al. |
| 2009/0158299 A1 | 6/2009 | Carter |
| 2009/0193074 A1 | 7/2009 | Lee |
| 2009/0199122 A1 | 8/2009 | Deutsch et al. |
| 2009/0199219 A1 | 8/2009 | Rofougaran et al. |
| 2009/0235200 A1 | 9/2009 | Deutsch et al. |
| 2009/0241072 A1 | 9/2009 | Chaudhri et al. |
| 2009/0276771 A1 | 11/2009 | Nickolov et al. |
| 2009/0287571 A1 | 11/2009 | Fujioka |
| 2009/0327917 A1 | 12/2009 | Aaron et al. |
| 2009/0328033 A1 | 12/2009 | Kohavi et al. |
| 2010/0064251 A1 | 3/2010 | Hufnagel et al. |
| 2010/0077347 A1 | 3/2010 | Kirtane |
| 2010/0097386 A1* | 4/2010 | Kim et al. .............. 345/545 |
| 2010/0107115 A1 | 4/2010 | Sareen et al. |
| 2010/0138515 A1 | 6/2010 | Ruiz-Velasco et al. |
| 2010/0192149 A1 | 7/2010 | Lathrop et al. |
| 2010/0211769 A1 | 8/2010 | Shankar et al. |
| 2010/0217912 A1 | 8/2010 | Rofougaran et al. |
| 2010/0245037 A1 | 9/2010 | Davis et al. |
| 2010/0313156 A1 | 12/2010 | Louch et al. |
| 2010/0313165 A1 | 12/2010 | Louch et al. |
| 2010/0319008 A1 | 12/2010 | Ho |
| 2010/0333088 A1 | 12/2010 | Rogel et al. |
| 2010/0333100 A1 | 12/2010 | Miyazaki et al. |
| 2011/0016299 A1* | 1/2011 | Galicia et al. .............. 713/1 |
| 2011/0016301 A1 | 1/2011 | Galicia |
| 2011/0022993 A1 | 1/2011 | Ohno et al. |
| 2011/0054879 A1 | 3/2011 | Bogsanyl et al. |
| 2011/0055602 A1 | 3/2011 | Kamay et al. |
| 2011/0066984 A1* | 3/2011 | Li .............. 715/863 |
| 2011/0093691 A1 | 4/2011 | Galicia et al. |
| 2011/0093836 A1 | 4/2011 | Galicia et al. |
| 2011/0119610 A1 | 5/2011 | Hackborn et al. |
| 2011/0126216 A1 | 5/2011 | Galicia |
| 2011/0138295 A1 | 6/2011 | Momchilov et al. |
| 2011/0138314 A1 | 6/2011 | Mir et al. |
| 2011/0144970 A1 | 6/2011 | Jiang et al. |
| 2011/0179387 A1 | 7/2011 | Shaffer et al. |
| 2011/0246786 A1 | 10/2011 | Laor et al. |
| 2012/0036450 A1 | 2/2012 | Canton |
| 2012/0041570 A1 | 2/2012 | Jones et al. |
| 2012/0042159 A1 | 2/2012 | Liu |
| 2012/0081353 A1 | 4/2012 | Yusupov et al. |
| 2012/0081380 A1 | 4/2012 | Reeves et al. |
| 2012/0083264 A1 | 4/2012 | Ramasamy et al. |

(56) References Cited

U.S. PATENT DOCUMENTS

| | | | |
|---|---|---|---|
| 2012/0084542 | A1 | 4/2012 | Reeves et al. |
| 2012/0084791 | A1 | 4/2012 | Benedek et al. |
| 2012/0102495 | A1 | 4/2012 | Gangam et al. |
| 2012/0150970 | A1 | 6/2012 | Peterson et al. |
| 2012/0151372 | A1 | 6/2012 | Kominac et al. |
| 2012/0173741 | A1 | 7/2012 | Brittain et al. |
| 2012/0173986 | A1 | 7/2012 | Jung |
| 2012/0174021 | A1 | 7/2012 | Dharawat |
| 2012/0192100 | A1 | 7/2012 | Wang et al. |
| 2012/0227058 | A1 | 9/2012 | Hunt et al. |
| 2012/0278747 | A1 | 11/2012 | Abraham et al. |
| 2012/0304092 | A1 | 11/2012 | Jarrett et al. |
| 2013/0160013 | A1 | 6/2013 | Pires et al. |
| 2013/0212283 | A1 | 8/2013 | Wang et al. |
| 2013/0293573 | A1 | 11/2013 | Wolfe et al. |
| 2013/0298140 | A1 | 11/2013 | Wolfe et al. |
| 2013/0298141 | A1 | 11/2013 | Wolfe et al. |
| 2013/0311682 | A1 | 11/2013 | Barat et al. |

FOREIGN PATENT DOCUMENTS

| | | |
|---|---|---|
| CN | 101149685 | 3/2008 |
| CN | 101203842 A | 6/2008 |
| CN | 101382833 A | 3/2009 |
| CN | 101615123 A | 12/2009 |
| CN | 101697181 A | 4/2010 |
| EP | 157783 A1 | 10/1985 |
| EP | 1059582 A2 | 12/2000 |
| EP | 1688816 A1 | 8/2006 |
| GB | 2369959 A | 6/2002 |
| JP | H 07-121336 A | 5/1995 |
| JP | 2005-242445 A | 9/2005 |
| JP | 2007-034600 A | 2/2007 |
| JP | 2009-157802 A | 7/2009 |
| RU | 2005136419 A | 5/2007 |
| RU | 2331160 C2 | 8/2008 |
| WO | WO-03/027876 A1 | 4/2003 |
| WO | WO-2005/043862 A1 | 5/2005 |
| WO | WO-2007/035611 A2 | 3/2007 |
| WO | WO-2010/148306 A1 | 12/2010 |
| WO | WO-2011/060382 A1 | 5/2011 |
| WO | WO-2012/012865 A1 | 2/2012 |
| WO | WO-2012/148881 A1 | 11/2012 |
| WO | WO-2012/148885 A1 | 11/2012 |

OTHER PUBLICATIONS

"Ubuntu Linux rocks!!!" (hereinafter Ubuntu) published Nov. 15, 2009 available at http://maxtheitpro.com/ubuntu-linux-rocks.*
"Getting Started with VMware Fusion", VMware Fusion for Mac OS X, vmware, Item: EN-000189-00, Copyright 2007-2009 VMware, Inc., all pages.
VMware Workstation 7, The Gold Standard in Desktop Virtualization, Product Datasheet, www.vmware.com, copyright 2009, VMware, Inc., all pages.
Windows Live Mesh, Windows Live, 2011 Microsoft, all pages.
Citrix: "Go ToAssist Corporate Remote Support Made Easy", www.gotoassist.com, Fact Sheet, 10.8.10/B-27141/PDF, 2010 Citrix Online, LLC, all pages.
Citrix: "Go ToAssist Corporate Remote Support Made Easy", www.gotoassist.com, Product Overview, 4.21.10/B-26651/PDF, 2010 Citrix Online, LLC, all pages.
Citrix: "Go ToAssist Express Remote Support Made Easy", www.gotoassist.com, Fact Sheet, 9.27.10/B-21307/PDF, 2010 Citrix Online LLC, all pages.
VMware: VMware Workstation 7 Product FAQs, downloaded from Internet Apr. 18, 2011, all pages.
Tatsuo Nakajima et al.: "Composition Kernel: A multi-core Processor Virtualization Layer for Rich Functional Smart Products", Oct. 13, 2010, Software Technologies for Embedded and Ubiquitous Systems, Springer Berlin Heidelberg, Berlin, Heidelberg, pp. 227-238.
Patent Cooperation Treaty, International Search Report and Written Opinion of the International Searching Authority for International Application No. PCT/US2012/021033 (CS37873), Apr. 11, 2012, 14 pages.
Paul, Ryan: "Canonical developers aim to make Android apps run on Ubuntu", May 26, 2009, http://arstechnica.com/gadgets/2009/05/canonical-developers-aim-to-make-android-apps-run-on-ubuntu/, all pages.
Kobie, Nicole: "VMware demos mobile virtualisation", Feb. 25, 2009, http://www.itpro.co.uk/609992/vmware-demos-mobile-virtualisation, all pages.
D'Sa, Francis: "Run Android apps on Windows", Nov. 21, 2011, http://tech2.in.com/how-to/apps/run-android-apps-on-windows/259042, all pages.
Tubbs, Travis: "Windows Live Mesh 2011 and SkyDrive Synced Storage woven together nicely; still a few loose threads", posted Friday, Oct. 29, 2010, http://www.wysiwygmedia.com/reviews/windows-live-mesh-2011-and-skydrive-synced-storage-woven-together-nicely-still-a-few-of-loose-threads.wm, all pages.
Ri chardson et al: "Virtual Network Computing", IEEE Internet Computi ng, IEEE Service Center, New York, NY, US, vol. 2, No. 1, Jan. 1, 1998, pp. 33-38.
Patent Cooperation Treaty, International Search Report and Written Opinion of the International Searching Authority for International Application No. PCT/US2012/034749, Jul. 19, 2012, 11 pages.
Bryan D Payne et al: "Secure and Flexible Monitoring of Virtual Machines". Computer Security Applications Conference, 2007. ACSAC 2007, Twenty-Third Annual, Dec. 1, 2007. pp. 385-397.
Bryan D Payne et al: "Lares: An Architecture for Secure Active Monitoring Using Virtualization", Security and Privacy, 2008. SP 2008. IEEE Symposium on, IEEE, Piscataway, NJ, USA,May 18, 2008, pp. 233-247.
Patent Cooperation Treaty, International Search Report and Written Opinion of the International Searching Authority for International Application No. PCT/US2012/034745, Sep. 4, 2012, 10 pages.
Codecoffee, "How to compile & execute C programs under Linux (Absolute basics)," Oct. 2009, retrieved from http://www.codecoffee.com/tipsforlinux/articles/18.html.
Maker, "A Survey on Android vs Linux," University of California 2009, pp. 1-10.
Meier "Professional Android 2 Application Development," Aug. 2010, retrieved from http://esys.ir/files/ref_books/android/esys.ir_professional%20android%202%20application%20development.pdf.
Wikipedia "Comparison of X Window System desktop environment," Jan. 2009, retrieved from http://en.wikipedia.org/wiki/Comparison_of_X_Window_System_desktop_environments.
Wikipedia "GNU C Library," Nov. 2009, retrieved from http://en.wikipedia.org/wiki/GNU_C_Library 4 pages.
Wikipedia "POSIX," Apr. 2009, retrieved from http://en.wikipedia.org/wiki/POSIX, 5 pages.
Wikipedia "Taskbar" retrieved from http://en.wikipedia.org/wiki/Taskbar dated Feb. 24, 10; 7 pages.
Wikipedia "X Window System," Jan. 2009, retrieved from http://en.wikipedia.org/wiki/X_window_system, 11 pages.
Casadevall, et al., "Android Execution Environment," retrieved from <https://wiki.ubuntu.com/Specs/AndroidExecutionEnvironment>, Apr. 28, 2009, 5 pages.
An Overview of Virtulization Techniques, Jun. 4, 2009 www.virtuatopia.com/index.pjp/AnOverview_of_Virtualization_Techniques, 4 pages.
Android Central Forums: Getting Started with Android—Tips and Tricks, http://forums.androidcentral.com/general-help-how/31622-getting-started-android-tips-tricks.html, Sep. 2010, excerpted 41 pages.
The Sun Babelfish Blog, "Why Apple Spaces is Broken," Nov. 2007, blogs.oracle.com/bblfish/entry/why_apple_spaces_is_broken, 24 pages.
Baentsch, "Mote Runner: A Mu,ti-Language Virtual Machine for Small Embedded Devices," 2009 3rd International Conference on Sensor Technologies and Applications, IEEE 10 pages.
Dormon: Motorola Atrix Lapdock, http://www.theregisterco.uk/Print/2011/08/19/accessory_of_the_week_motorola_atrix_lapdock, Aug. 2011, 8 pages.

(56) References Cited

OTHER PUBLICATIONS

Hassan, "Ubiquitous Computing and Android" 3rd International Conference Digital Information Management 2008, IEEE 6 pages.

Herrman: VMWare for Mobile Devices Lets yuou Run Windows and Android Simultaneously, http://gizmodo.com/5160685/vmware-for-mobile-devices-lets-you-run-windows-and-android-simultaneously/all, Feb. 2009, 2 pages.

Kernel (computing) from Wikipedia http://en.wikipedia.org/wiki/Kernal_(computer_science); 18 pages, printed Jun. 5, 2009.

Martin: iTunes 9.0.2 Improves App Sorting, http://reviews.cnet.com/8301-19512_7-10387022-233.html?tag=contentMain;contentBody;1n, Oct. 2009, 5 pages.

Parallels: Parallels Workstation, http://www.parallels.com/products/workstation/, downloaded Dec. 28, 2012.

Ramananthan: Ubuntu for Android: The Complete Story, http://www.muktware.com/2012/02/ubuntu-for-andriod-the-complete-story/2553, Feb. 2012, 5 pages.

The Xen Team: "Users' manual Xen v 2.0 for x86" University of Cambridge, UK Dec. 31, 2004 56 pages.

Turner, "Introducing Android 1.5 NDK, Release 1" Jun. 25, 2009 4 pages.

Ubuntu from Wikipedia http://en.wikipedia.org/wiki/ubuntu; 12 pages, printed Jun. 5, 2009.

Ubuntu Mobile from Wikipedia http://en.wikipedia.org/wiki/ubuntu_mobile; 2 pages, printed Jun. 5, 2009.

Whitwam: EverythingYou Need to Know about Ubunto for Android; http://www.tested.com/tech/android/3627-everything-you-need-to-know-about-ubuntu-for-android/, Feb. 2012, 5 pages.

Gelchlik, "How to Lock Your Fcomputer with Bluetooth Proximity Lock Utility," Apr. 2010, http://www.makeuseof.com/tag/lock-windows-computer-bluetooth-proximity-lock-utility/.

Mac OS X Hints, "Lock and unlock a Mac using Bluetooth detection," Dec. 2009, http://hints.macworld.com/article.php?story=20091221173111783.

Ubuntu forums, "Howto: Use BlueProximity and your cellphone for security," Feb. 2008, http://ubuntuforums.org/showthread.php?t=702372.

Webtop Application, archived Apr. 29, 2011, 6 pages, retrieved from https://web.archive.org/web/20110429011220/http://www.motorola.com/support/us-en/consumersupport/software/webtop_application.

* cited by examiner

US 9,354,900 B2

METHOD AND APPARATUS FOR PRESENTING A WINDOW IN A SYSTEM HAVING TWO OPERATING SYSTEM ENVIRONMENTS

RELATED APPLICATION

This application is related to U.S. application Ser. No. 13/013,341, filed on Jan. 25, 2011, which is entitled "METHOD AND APPARATUS FOR LOCKING AND UNLOCKING MULTIPLE OPERATING SYSTEM ENVIRONMENTS WITH A SINGLE GESTURE INPUT," and assigned to the assignee hereof.

FIELD OF THE INVENTION

The present invention relates generally to multi-environment operating systems and in particular, to a method and apparatus for presenting windows of the multiple operating system environments.

BACKGROUND OF THE INVENTION

Some mobile devices have the capability to utilize multiple run-time environments simultaneously on a single processor. A user of such a device may operate a first operating environment (e.g., Android) and a second operating environment (e.g., GNU Linux) simultaneously. When operating such a device, at least two co-existing independent middleware operating environments coupled to a core kernel are provided where the middleware operating environments each have a corresponding application component.

When a single display device is utilized as a user interface to a mobile device running multiple operating system environments (e.g., Android and GNU Linux), there may exist two windows on the display device. A first window may exist on a first portion of the display (e.g., an Android window that shows the Android environment). A second window, or background window, may also exist on the display (e.g., a background window showing a GNU Linux desktop environment). The user interaction can be confusing or cumbersome when the user attempts to interact with each of the operating system environments.

Figure 1:
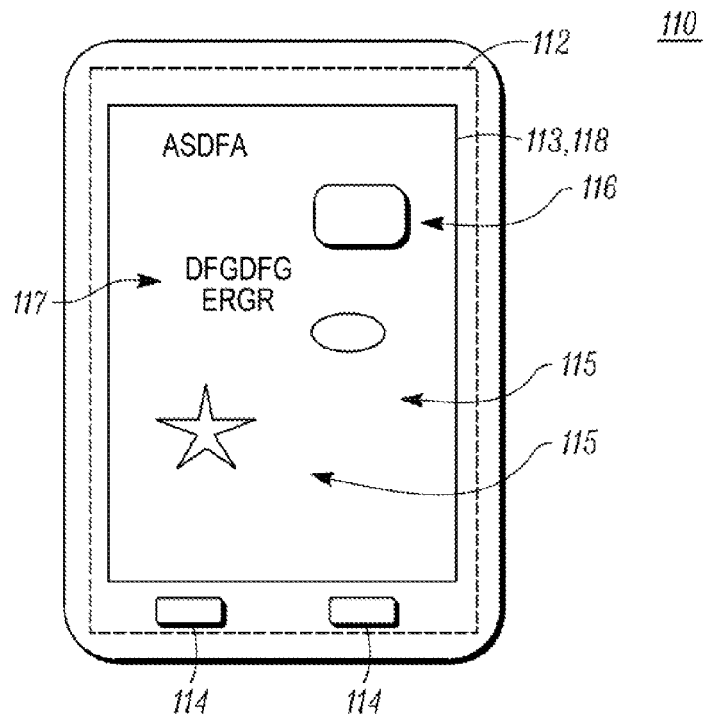
FIG. 1 is a diagram of a mobile device.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments that include the present invention. Also, common but well-understood elements that are useful or necessary in a commercially feasible embodiment are often not depicted in order to facilitate a less obstructed view of these various embodiments, which include the present invention. It will further be appreciated that certain actions and/or steps may be described or depicted in a particular order of occurrence while those skilled in the art will understand that such specificity with respect to sequence is not actually required in all instances. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to provide for efficient rendering of a window of a first operating system within a desktop of a second operating system, some embodiments are described.

The present invention encompasses a method comprising the following steps. Firstly, executing a first operating system environment (first OSE) in a native mode on a central processing unit (CPU) of a mobile device. The mobile device comprises a first graphical user interface (GUI). The first OSE generates graphical data for a first OSE window, wherein the first OSE window can be used on the first GUI for interfacing with the first OSE.

Secondly, executing a second operating system environment (second OSE) in a native mode on the CPU of the mobile device. The second OSE generates a GUI desktop that is displayed on a second GUI. In some embodiments the second GUI is external to the mobile device. In other embodiments, the second GUI may be the first GUI (i.e., the display for the first and second GUI's is the same mobile display). In yet other embodiments, each of the first and second GUI's may comprise a different display on one mobile device.

Thirdly, rendering on the GUI desktop a window that comprises the first OSE window (this first OSE window within a window on the GUI desktop is hereafter referred to as the WIW), using commands of the second OSE.

The present invention further encompasses an apparatus comprising a central processing unit (CPU) existing on a device. The CPU performs the steps of executing a first operating system environment and executing a second operating system environment that provide the features described in the above method.

Figure 2:
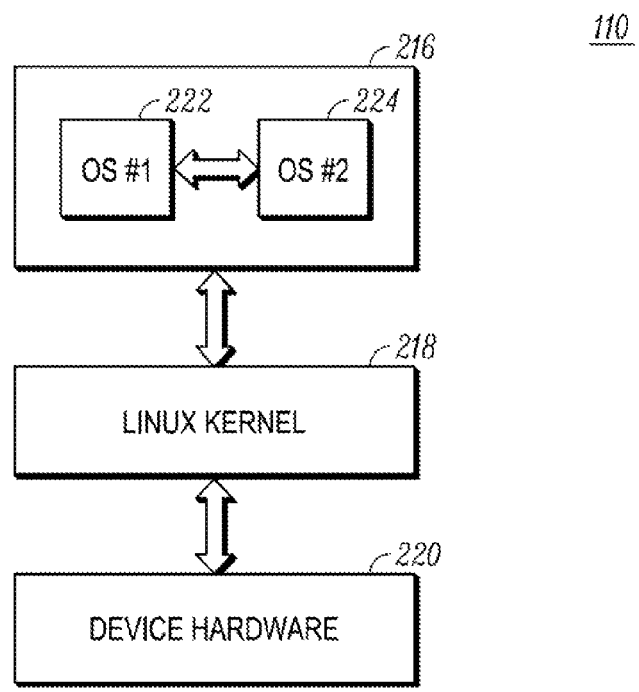
FIG. 2 is a software/hardware architectural block diagram of the mobile device.

Turning now to the drawings, where like numerals designate like components, FIG. 1 shows a diagram of a mobile device 110 that is a mobile telephone, in accordance with some embodiments. The mobile device 110 includes a graphical user interface GUI 112 that comprises a display screen 113 (alternatively, display or screen) that may be touch sensitive and a plurality of physical buttons 114. The physical buttons may be of the type called soft buttons, for which their functions are defined by text or graphics on the display 113. The GUI 112 provides input and outputs for human interfacing to software that operates the mobile device 110. The mobile device 110 is selected from the group including, but not limited to, a mobile personal computer (PC), a netbook, a mobile telephone, a laptop computer, a handheld computer and a smart phone. Although the device 110 is mobile, it is intended to have significant computing power, with a processor speed in excess of 500 MHz, although slower processors are not excluded. Considering the computing power, a user can connect the mobile device 110 to a variety of peripheral devices (not shown in FIG. 1). The peripheral devices are selected from a group including, but not limited to, computer monitor, a laptop computer, a desktop computer, a tablet PC, and a screen projector. FIG. 2 illustrates some graphical icons. In some embodiments the display 113 is a touch screen display. The display can display one of a plurality of windows generated by an OSE executing an application. The display 113 shown in FIG. 1 is displaying a full screen window 118. By full screen window is meant a window that determines the color and intensity of light for all the pixels on the screen 113. In some embodiments, all windows generated for the mobile device are all full screen windows. Shown on the display 113 and window 118 are some graphical icons 115, a virtual button 116, and some text 117.

Referring to FIG. 2, a software/hardware architectural block diagram of the mobile device 110 shows an exemplary software environment 216 in communication with a Linux kernel 218, in accordance with some embodiments. The software environment 216 comprises applications that each run within one of multiple operating system environments, and shows an example of two operating system environments. Certain portions 220 of the hardware of the mobile device 110 are also in communication with the Linux kernel 218. The software environment 216 includes a first operating system environment (OSE) 222 and a second operating system environment (OSE) 224 in communication with the Linux kernel 218, which is a single kernel. These operating system environments are also described herein as middleware, because they operate using the Linux kernel 218 to interact with the memory and hardware elements of the mobile device 110. The first OSE 222 and the second OSE 224 each execute in their own native mode. By example, the second operating system environment 224 is a standard Linux distribution and the first operating system environment 222 is an embedded operating system environment intended for use in mobile devices, such as an Android™ (Open Handset Alliance, www.openhandsetalliance.com) operating system. The software environment 216 is in communication with the Linux kernel 218, which is in communication with the device hardware 220.

An exemplary software environment 16 includes Ubuntu® (Canonical Ltd., www.ubuntu.com) for the Linux-based operating system environment 224. The multiple middleware operating system environments co-exist independent of the other(s). Exemplary environments that can be included in software environment 216 include Android™ (Google, Inc., www.google.com), Ubuntu® (Canonical Ltd., www.ubuntu. com), standard Linux-based environments, Symbian (Symbian Foundation Ltd., www.symbian.com), and Windows-based environments. In an alternative embodiment, it is envisioned that greater than two operating system environments are configured to co-exist independently on the same core kernel 218.

Figure 3:
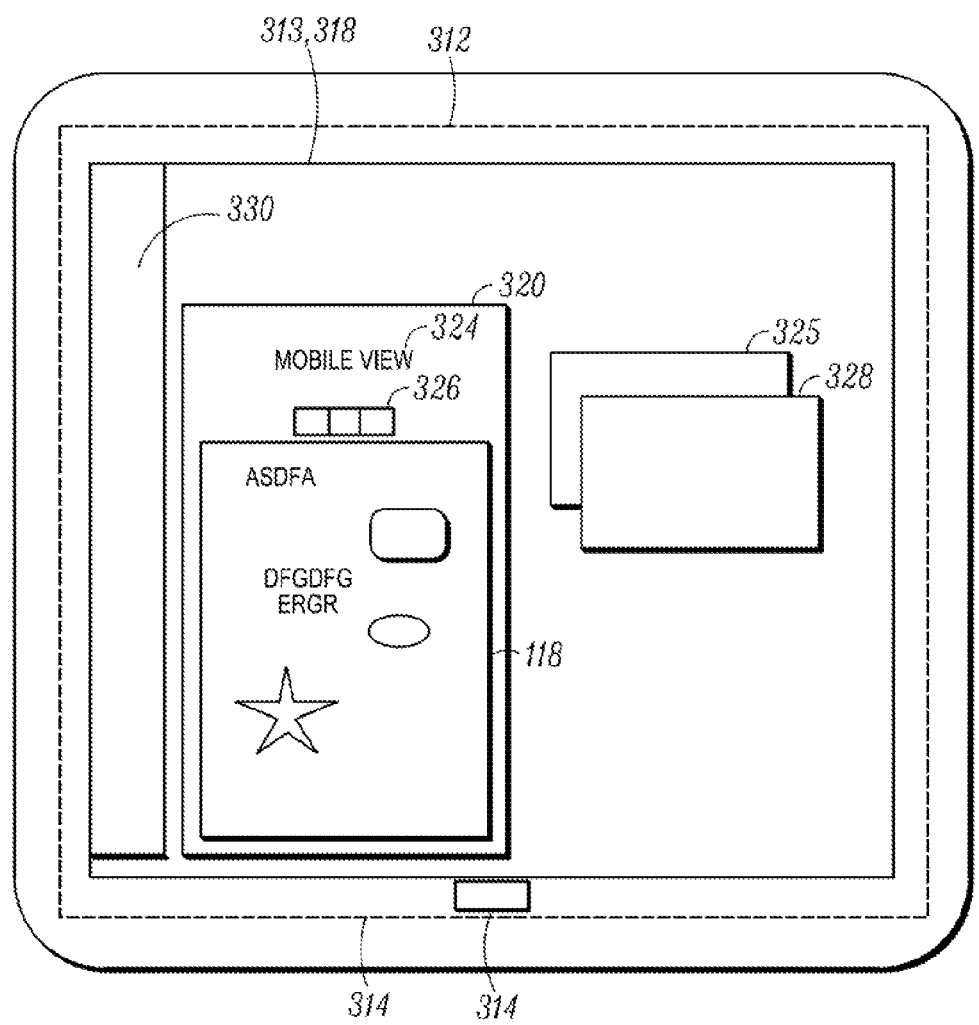
FIG. 3 is a diagram of an external device.

Referring to FIG. 3, a diagram shows an external device 310 that comprises a second GUI 312 having a touch sensitive display 313 and may comprise some physical buttons 314, in accordance with some embodiments. The display 313 may be a touch screen display. The physical buttons may be of the type called soft buttons, for which their functions are defined by text or graphics on the display 313. A physical keyboard (not shown in FIG. 3) may be a part of the second GUI 312. The second GUI 312 provides input and outputs for human interfacing to software that operates the mobile device 110 and the external device 310. The external device 310 can be coupled to the mobile device 110 either by wired (for example, High Definition Multimedia Interface [HDMI]) or wireless (for example, Bluetooth) means. A docking station (not shown in FIG. 3) may be provided for the mobile device 110 to plug into. The docking station may then provide a wired or wireless connection to the external display 310, which may be a TV monitor or a digital display monitor such as used for laptops. The docking station may incorporate or couple to a physical keyboard. The external device 310 may comprise only sufficient electronics to accept display information over the coupling means and drive the display 313 of the second GUI with the information, and to accept user touch inputs from the display and physical buttons on the second GUI.

In one embodiment the external display comprises an external monitor attached to device 100 via a HDMI cable. As shown, external display 313 renders a desktop 318 this is a full screen desktop and therefore has the same boundary as the display 313. The desktop includes a system status bar 330 that shows the statuses of windows that are open, each window being generated by an application that is being executed by the second OSE. In FIG. 3, windows 320, 325, 328 are open. In this particular embodiment, window 320 is a window generated by an application being executed by the second OSE that duplicates the window 118 and may add additional graphics, such as tabs 326 and a title 324. As discussed above, the first OSE 22 and the second OSE 24 operate independently from each other, and co-exist with respect to the other. Each OS 22, 24 is a fully functioning operating system environment, and does not need the other operating system environment to function. The two operating system environments exist on the same mobile device 100 with independence with respect to the other.

It should be noted that although not shown clearly in windows 325 and 328, each window 325, 328 would contain icons and graphics that represent standard applications that are being executed by the second OSE.

Figure 4:
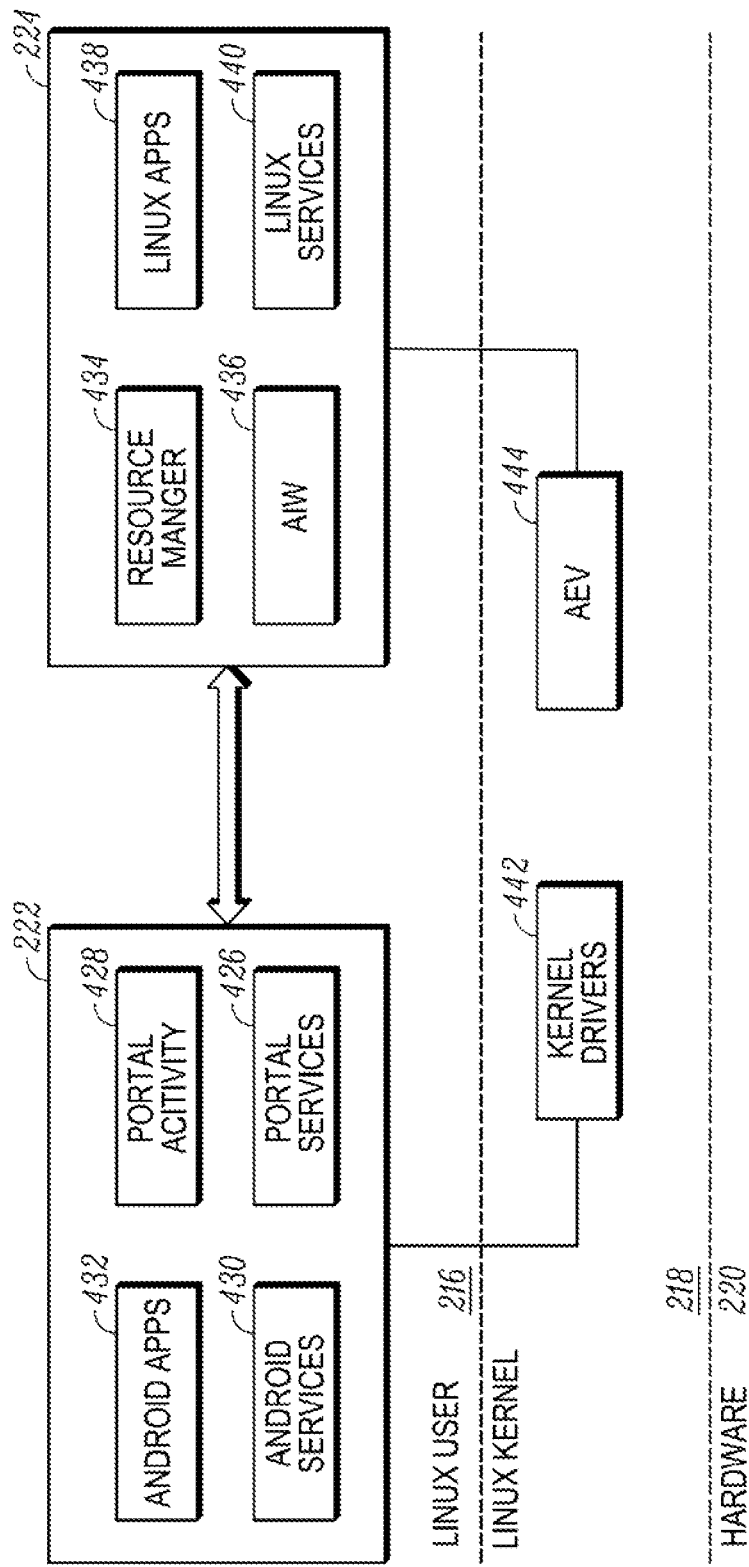
FIG. 4 is a software/hardware architectural block diagram of the mobile device, detailing a runtime co-existence schema of a software environment.

Referring to FIG. 4, a software/hardware architectural block diagram of the mobile device 110 is shown, detailing a runtime co-existence schema of a software environment, in accordance with some embodiments. In the present exemplary embodiment, the first OSE 222 is an Android™ based operating environment and the second OS environment 224 is Ubuntu® The first operating system environment 222 includes a portal service module 426, a portal activity module 428, an OS services module 430 and a set of first OS applications 432. The second operating system environment 424 includes a resource manager 434, an Android in a window (AIW) module 436, a set of second OS applications 438 and a second OS services module 440. In embodiments in which the first OSE 222 is something other than Android, AIW can be referred to as a window in a window WIW.

In some embodiments, the AIW module 436 is configured to display a first OSE window 118 within a window 320 that is rendered on the desktop portion of the GUI display 313 of the external device 310 (FIG. 3). The second OSE 224 drives the second GUI 312 of the external device 310.

The portal service module 426 directs all communication with the resource manager 434. Additionally, the portal service module 426 is connected to activity associated with the portal activity module 428, as well as first OSE 222 broadcast events.

The second OSE 224 provides a desktop presentation 318 that may be presented on the display 313 of the second GUI 312. The desktop 318 is similar to desktops presented on laptop and desktop computers, having a background (wallpaper) area, and a system and an application status area (a Taskbar in Microsoft Windows terminology). One application or a plurality of applications that are being executed on the second OSE 224 may be presented simultaneously on the desktop 318. One of the applications is deemed to have "focus" at any given time, meaning that user interaction with that application is primarily by means of the window of that application. (That is to say, very few user interactions can be made by means other than the window that is in focus. An example is that the window may be maximized, minimized or closed by a user action in the region of the status bar). The application can also respond to system events. Each application window is controlled by the second OSE 224 to have a particular position. The second OSE application (e.g., one of 320, 325, 328 that is in focus is controlled by the second OSE 224 to be identifiable as being in focus by being given unique visual characteristics (such as a different border color, for example). Application windows may or may not overlap on the display of the second GUI, but when they do, each is controlled to appear in some layer order behind the second OSE window that is in focus. (e.g., if window 320 of FIG. 3 is in focus, then if window 325 or 328 were moved to overlap window 320, they would appear to be behind window 320).

Certain ones of the applications that execute on the first OSE 222 can present differing windows that are each usable on the first GUI display 113, one at a time. The window that is being rendered at a given time for the first GUI 112 is herein termed the first OSE window 118. In some embodiments, every first OSE window 118 is a full screen window. The first OSE window 118 presents graphical information from a first OSE application, that is to say, an application that is being executed on the first OSE 222. Examples are the home screen, a phone book application, a game application, and a web browser application. For some of the first OSE applications the first OSE 222 may also present graphical information relevant to certain system states (e.g., call indicator, signal strength, time, battery status, etc.). This combined presentation is rendered on the first GUI display 113 by commands of the first OSE 222 that use the graphical information from one of the first OSE applications. This first OSE window 118 can be used for the purpose of user interface with the first OSE 222, including interaction with the first OSE application that is generating graphical information for the first OSE window 118. For simplicity, and in more general terms, this document describes such a user interaction as being "with the OSE" that includes the OSE application that is providing much of the graphics for the window, it being understood that the user inputs are passed through the OSE to the OSE application.

The kernel 218 includes a set of drivers 442 and an AEV module 444. Included with the drivers 442 are input device drivers for hardware components 220. The AEV 444 is a kernel module that takes absolute coordinate and keyboard events from AIW 436 when it has focus and passes them to an event hub.

The co-existing operating system environments within operating system 16 communicate with each other. The resource manager 434, which is part of the second OSE 224, communicates directly with the portal service module 426, which is part of the first OSE 222. Furthermore, the portal service module 426, which is part of the first OSE 222, communicates directly with the resource manager 434. The resource manager 434 is a set of instructions configured to manage resources shared by the first OSE 222 and second OSE 224. The shared resources may include display devices, input devices, power management services and system state information. Furthermore, the resource manager 434 is configured to control OSE 222 and OSE 224 access to the hardware 220. Additionally, the resource manager 434 identifies and controls which OSE user interface is displayed through each of the first GUI 112 and second GUI 312

According to the present embodiment, the portal service 426 is the source of all communications from the first OSE 222 to the resource manager 434. Additionally, the portal service 426 is a sink for all callbacks from the resource manager 434 to the first OSE 222. The resource manager 434 provides a status discoverable application programming interface (API) to the portal service 426. This API is configured to be called by the resource manager 434 at any time. The resource manager 434 is configured to obtain and process runtime status, which allows for the resource manager to maintain a state machine. For the first OSE 222, the portal service 426 provides runtime status to processes that require them. Similarly, the portal service 426 requests and receives status updates from processes which provide status information. A similar communication for the second OSE 224 is controlled by the resource manager 434, which provides runtime status to the processes that require them. Resource manager 434 requests and receives status updates from various processes that provide status information. Device drivers 442 logically associated with the kernel 218 communicate directly with the resource manager 434 as well as the processes that provide runtime status information. By example, the API arbitrates access to user interface devices, such as displays, touch screens or the GUIs. Yet another example, the API arbitrates access to power input devices, such as batteries and/or AC/DC wall plugs.

The first OSE 222 and the second OSE 224 are independent from the other, and co-exist with respect to the other. Each OSE 222, 224 is a fully functioning operating system environment, and does not need the other operating system environment to function. The two operating system environments exist on the same device 110 with independence with respect to the other. As identified above, the first and second OSE 222, 224 do not co-exist in a virtualization or emulation scheme, but in fact each operates in its native mode on a single kernel 218. There is runtime co-existence in which both OSE 222, 224 run in their respective native environments and neither OSE 222, 224 is recompiled, as there is no need to leverage a common C runtime environment. Applications can be accessed by a user which are coded purely for one or the other OSE 222, 224 without an interruption to a user's computing experience.

Figure 5:
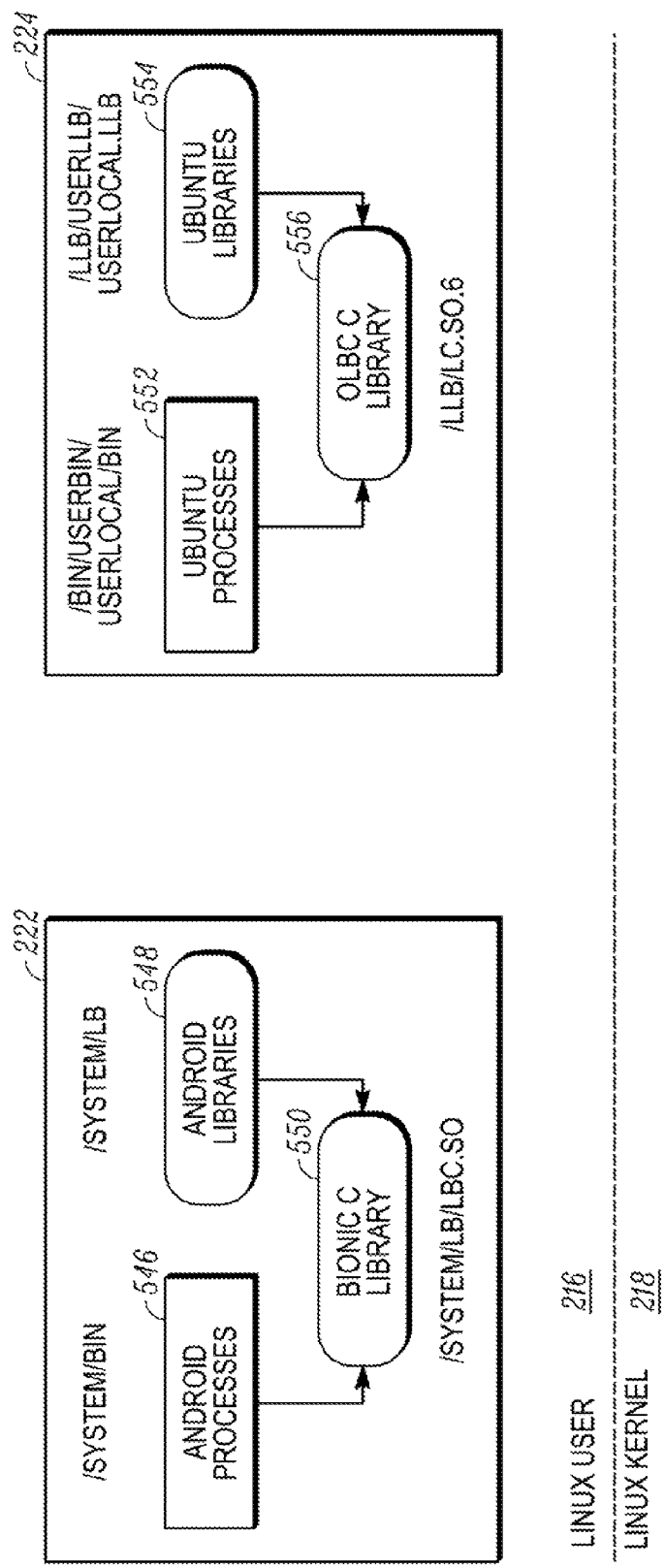
FIG. 5 is a block diagram of a runtime co-existence schema of a software environment.

Referring to FIG. 5, a block diagram shows a co-existence scheme for an Android® OSE 222 and an Ubuntu OSE 224, in accordance with some embodiments. Each OSE 222, 224 operates on a separate runtime environment, which provides software services for programs and/or processes while the device 100 is operating. Android processes 546 and Android libraries 548 access a Bionic C Library 550, which is optimized and modified specifically for the Android environment. Ubuntu processes 552 and Ubuntu libraries 554 access a Glibc C Library 556, which is a GNU C library used in many standard desktop Linux-based systems. Each OSE runs on its respective C libraries without conflicting with another operating environment. These attributes are also true in embodiments using other types of OSE's.

Figure 6:
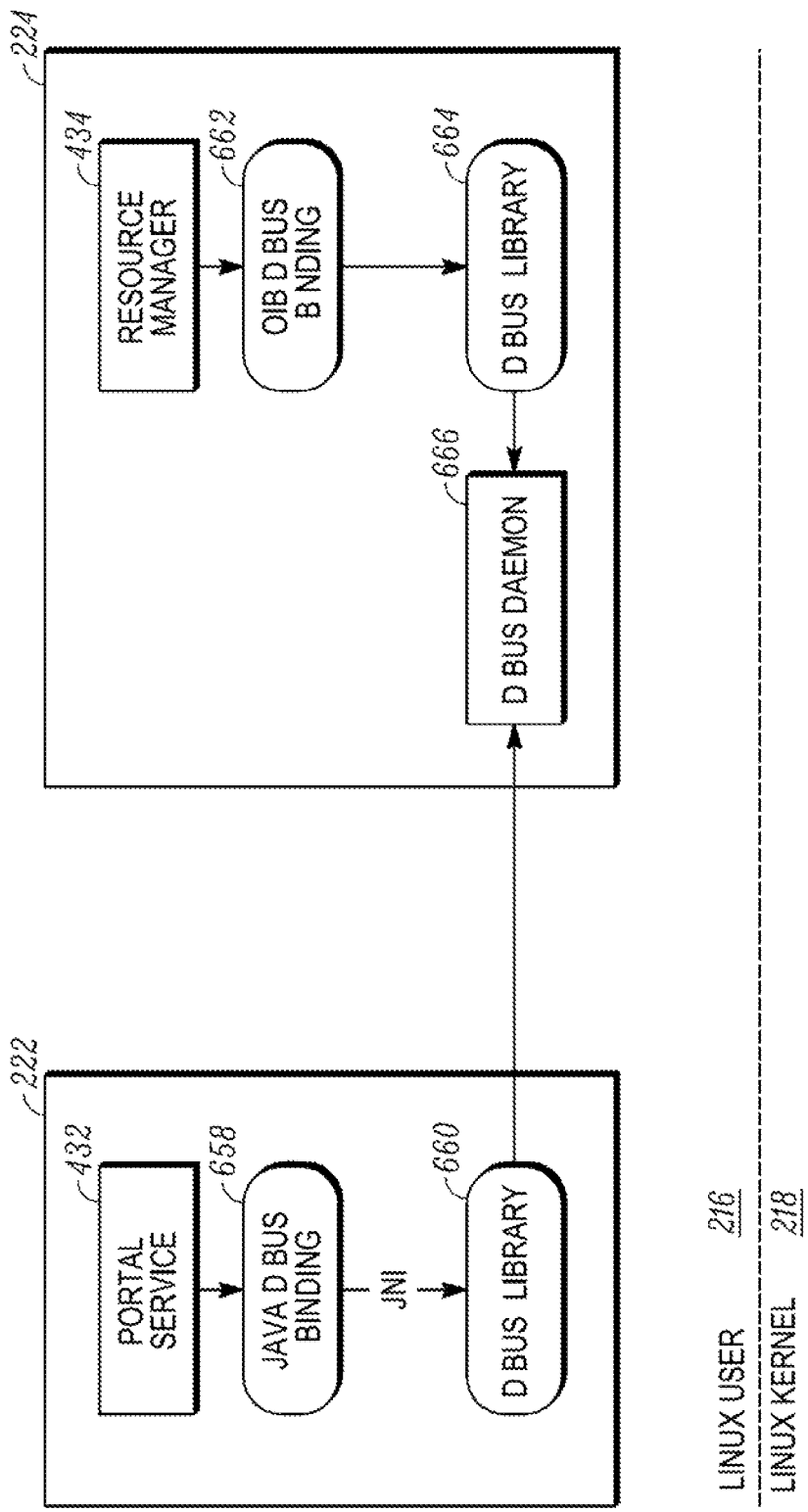
FIG. 6 is block diagram of an inter-environment communication schema of an exemplary operating system.

Referring to FIG. 6, a more detailed communication path between the first OSE 222 and the second OSE 224 described in FIG. 5 is provided, in accordance with some embodiments. An inter-process communication (IPC) system is configured to manage the inter-environment communication flow between the first OSE 222 and the second OSE 224. The portal service 426 communicates with a DBUS Binding 658, which is a software package containing programming language and executable instructions configured to communicate with a DBUS library 660. The resource manager 634 communicates with a Glib DBUS binding 662, which also is a software package containing programming language and executable instructions configured to communicate with a DBUS library 664 configured for the second OSE 224. Both the first OSE 222 DBUS library 660 and the second OSE 224 DBUS library 664 communicate through a DBUS Daemon 666, which is logically part of the second OS 24, and acts as the communication link between the two operating environments.

Figure 7:
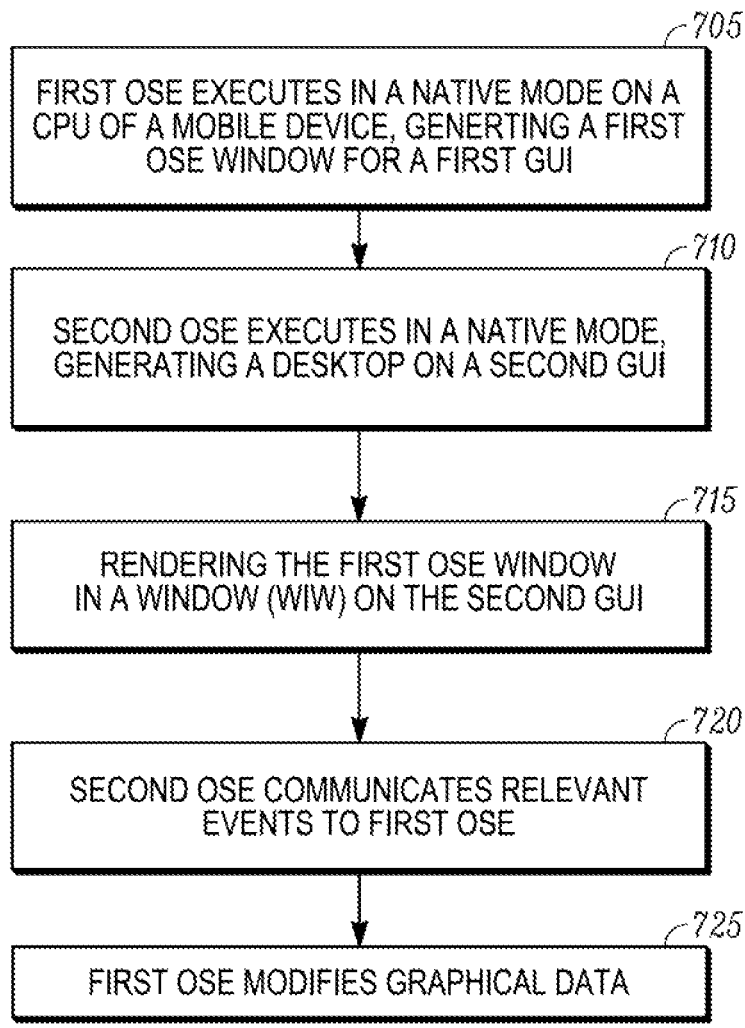
FIG. 7 is a flow chart that shows some steps of a method of rendering an OSE window in a window (WIW) of a desktop of a second OSE.

Referring to FIG. 7, a flow chart 700 shows some steps of a method of rendering an OSE window in a window of a desktop of a second OSE, in accordance with some embodiments. At step 705, a first operating system environment (first OSE) 222 executes in a native mode on a central processing unit (CPU) of a mobile device 110. The mobile device 110 comprises a first graphical user interface (GUI) 112. The first OSE 222 generates graphical data for a first OSE window 118. That is to say, the first OSE 222 (including, but not limited to, the application in focus) generates graphical data from which the pixel values are derived that are stored in a frame buffer. The pixel values in the frame buffer are used to drive one of the displays 113 and 313. The first OSE window 118 can be used on the first GUI 112 for interfacing with the first OSE 222.

At step 710, the second operating system environment (second OSE) 224 executes in a native mode on the CPU of the mobile device 110. The second OSE 224 generates the desktop 318 that is displayed on a second GUI 312. The second GUI provides for user interface to the second OSE 224. In some embodiments the second GUI 312 is a portion of a device 310 that is external to and coupled to the mobile device 110. In other embodiments, the second GUI 312 may be the first GUI 112 (i.e., the display for the first and second GUI's is the mobile display 118). In yet other embodiments, each of the first and second GUI's may comprise two different displays on one mobile device (not shown in FIGS. 1 and 3).

At step 715 a window 320 is rendered on the desktop 318 that comprises the first OSE window 118 using commands of the second OSE 224. The window 320 is hereafter referred to as the WIW 320. The rendering is responsive to user inputs within the region of the first OSE window 118 within the window 320 that are sensed by the second OSE 224.

It will be appreciated that the steps 705-715 of this unique method described above provide significant benefits because the desktop 318 within which the first OSE window 118 is shown provides for such graphical objects as titles and status indicators that relate to the first OSE window 118, but are actually formed outside the image of the first OSE window 118 by the second OSE 224 and which provide information that relates directly to the first OSE window 118.

At step 720, the second OSE 224 communicates relevant events to the first OSE 222. The relevant events comprise user inputs that occur within a region of the WIW 320 when the WIW 320 is in focus and global input events relevant to one of the first OSE and first OSE applications. The first OSE passes these inputs to the application of the first OSE that is in focus on the second GUI 312, or to the first OSE if the inputs are system inputs. As an example of a user input, if the user input is a name selection in a telephone book application that is presenting a directory on the WIW 320, then the input is passed to the telephone book application. As an example of a global event, an indication may issue from the hardware of the external device that a level setting of an audio volume control has been changed. That event may be passed to a sound application of the first OSE 222, in response to which the sound application of the first OSE 222 modifies a signal level of audio being coupled to the external device, and may modify a system indicator of the first OSE window.

At step 725, in response to events that are relevant to the application that is in focus on WIW 320, the first OSE will, in many cases, alter the graphical data for the OSE window 118. This may occur when the relevant event is one that affects the information shown on the first OSE window 118. The step 715 of rendering the WIW 320 includes rendering these changes as they occur, using steps 720 and 725. The application in focus generates and modifies the graphical data of the first OSE window 118 in response to events, and the modification may be substantial. Other software in the first OSE (some of which is described herein above in conjunction with FIGS. 4-6) may alter the graphical data of the first OSE window 118 to a lesser extent (such as changing the number of bars in a battery icon). The second OSE 224, however, typically does not modify the first OSE graphical data very much. For example, the second OSE 224 may only scale the first OSE graphical data. In some embodiments, the second OSE does not modify the graphical data of the first OSE window 118 at all.

Figure 8:
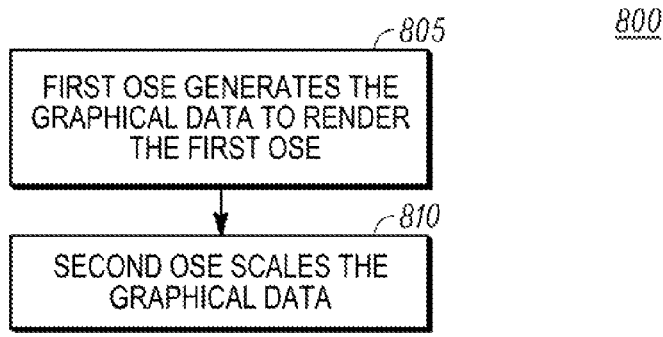
FIG. 8 is a flow chart that shows some steps of a method for modifying graphical data generated by an operating system environment.

Referring to FIG. 8, a flow chart 800 shows some steps of a method for modifying the graphical data generated by the first OSE 222, in accordance with some embodiments. At step 805, the first OSE 222 generates all the graphical data needed to render the first OSE window 118. This step may comprise modifying graphical data that has been previously generated for the first OSE window 118, using steps 720 and 725 described above. At step 810, the second OSE 224 scales the graphical data for presentation in the WIW 320 of the desktop 318 of the external device 310. At step 815, the second OSE renders the desktop 318 of the second device, including a WIW 320 that comprises a scaled version of the first window 118.

It will be appreciated that step 720 provides the benefit of updating the first OSE window 118 by means of the second OSE 224 from the second GUI 318 or from relevant events of the second OSE 224, making it appear to the user that there exists direct interface with the first OSE window 118.

In other embodiments, other minor aspects, such as border colors of the first window 118, may be altered by the second OSE 224.

Figure 9:
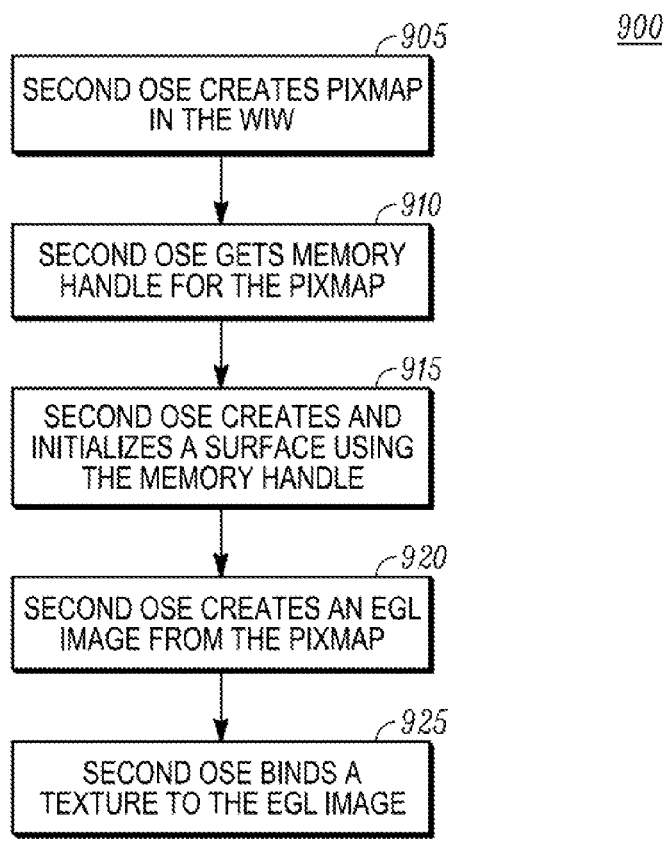
FIG. 9 is a flow chart that shows some steps of a method of initializing a WIW.

Referring to FIG. 9, a flow chart 900 shows some steps of a method of initializing the WIW 320, in accordance some embodiments. In these embodiments, the mobile device 110 includes a graphics processing unit, such as an NVIDIA AP20 graphics processing unit (GPU) chipset, and the first OSE 222 is an Android OSE. At step 905, the second OSE creates a pixmap corresponding to the first OSE window 118 in the WIW 320. At step 910, the second OSE 224 gets the memory handle for this pixmap. At step 915, the second OSE 224 creates and initializes a surface using this memory handle. At step 920, the second OSE creates an EGL (Khronos Native Platform Graphics Interface) image from the pixmap. At step 925, the second OSE 224 binds a texture to the EGL image.

Figure 10:
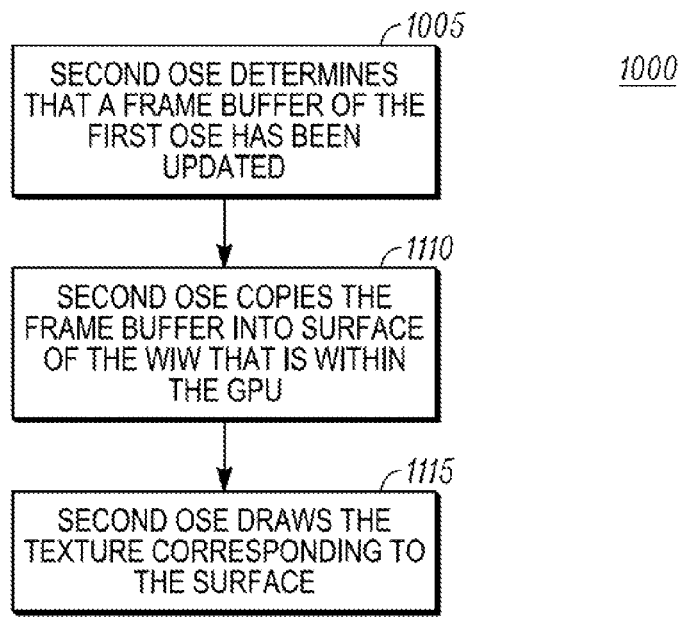
FIG. 10 is a flow chart that shows some steps of a method of rendering the WIW of FIG. 9.

Referring to FIG. 10, a flow chart 1000 shows some steps of a method of rendering the WIW 320, in accordance with the embodiments described with reference to FIG. 8. At step 1005 the second OSE 224 determines by a communication from the first OSE 222 that a frame buffer of the first OSE window 118 has been updated, which may occur, for example, as a result of steps 720, 725, and/or steps 805 and 810 described herein above. At step 1010 the second OSE 224 copies the frame buffer into a surface of the WIW 320 that is within the GPU. At step 1015 the second OSE 224 draws the texture corresponding to the surface. In some embodiments, this is the only frame buffer used by the first OSE 222. It will be appreciated that this technique is an efficient method for updating the first OSE window 118 as presented on the second GUI 318.

Figure 11:
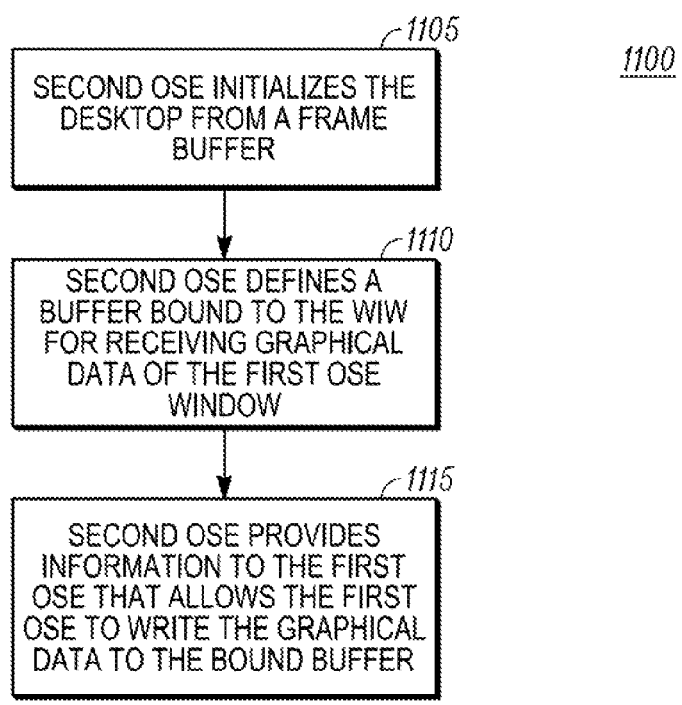
FIG. 11 is a flow chart that shows some steps of a method of initializing a WIW.

Referring to FIG. 11 a flow chart 1100 shows some steps of a method for initializing the WIW 320 in accordance with some embodiments. At step 1105, the second OSE 224 initializes the desktop 318 of the second GUI 312. The desktop (the desktop image) is written from a frame buffer, which is a dedicated storage portion of the CPU that is reserved for storing the pixel values for a display, which in this embodiment is the display 313. At step 1110, the second OSE 224 defines a buffer area in memory to receive graphical data of the first OSE window. The buffer is bound to the WIW 320 located on the desktop 318. At step 1115, the second OSE 224 provides address information to the first OSE that allows graphical data to be written into the buffer by the first OSE.

Figure 12:
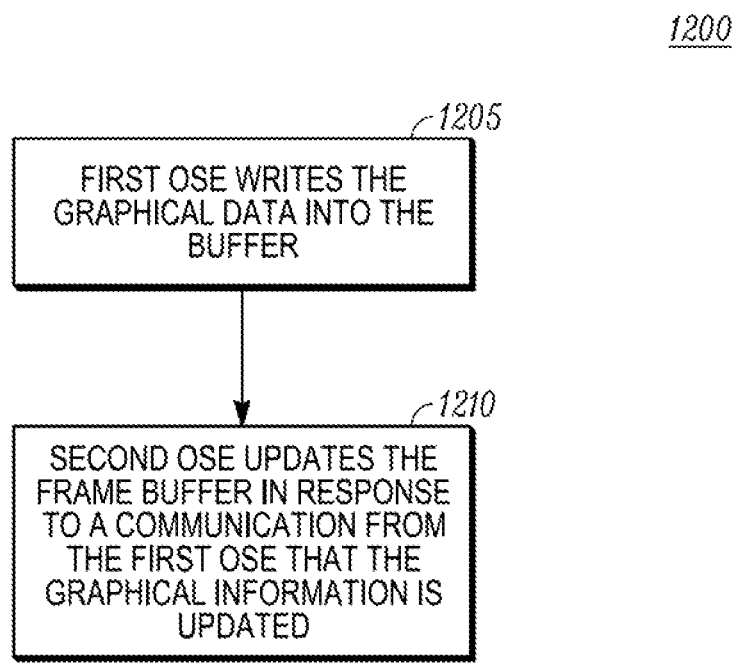
FIG. 12 is a flow chart that shows some steps of a method of rendering the WIW of FIG. 11.

Referring to FIG. 12, a flow chart 1200 shows some steps of a method of rendering the WIW 320, in accordance with the embodiments described with reference to FIG. 11. At step 1205, the first OSE 222 writes the graphical data into the buffer or modifies the graphical data in the buffer. Modification may occur, for example, as a result of steps 720, 725, and/or steps 805 and 810 described herein above. At step 1210, the second OSE 224 determines by a communication from the first OSE to update the frame buffer of the desktop 318 using the graphical data in the buffer. The second OSE 224 then updates the frame buffer of the desktop from the graphical data in the buffer, which completes the rendering process. It will be appreciated that this technique is an efficient method for updating the first OSE window 118 as presented on the second GUI 318.

Figure 13:
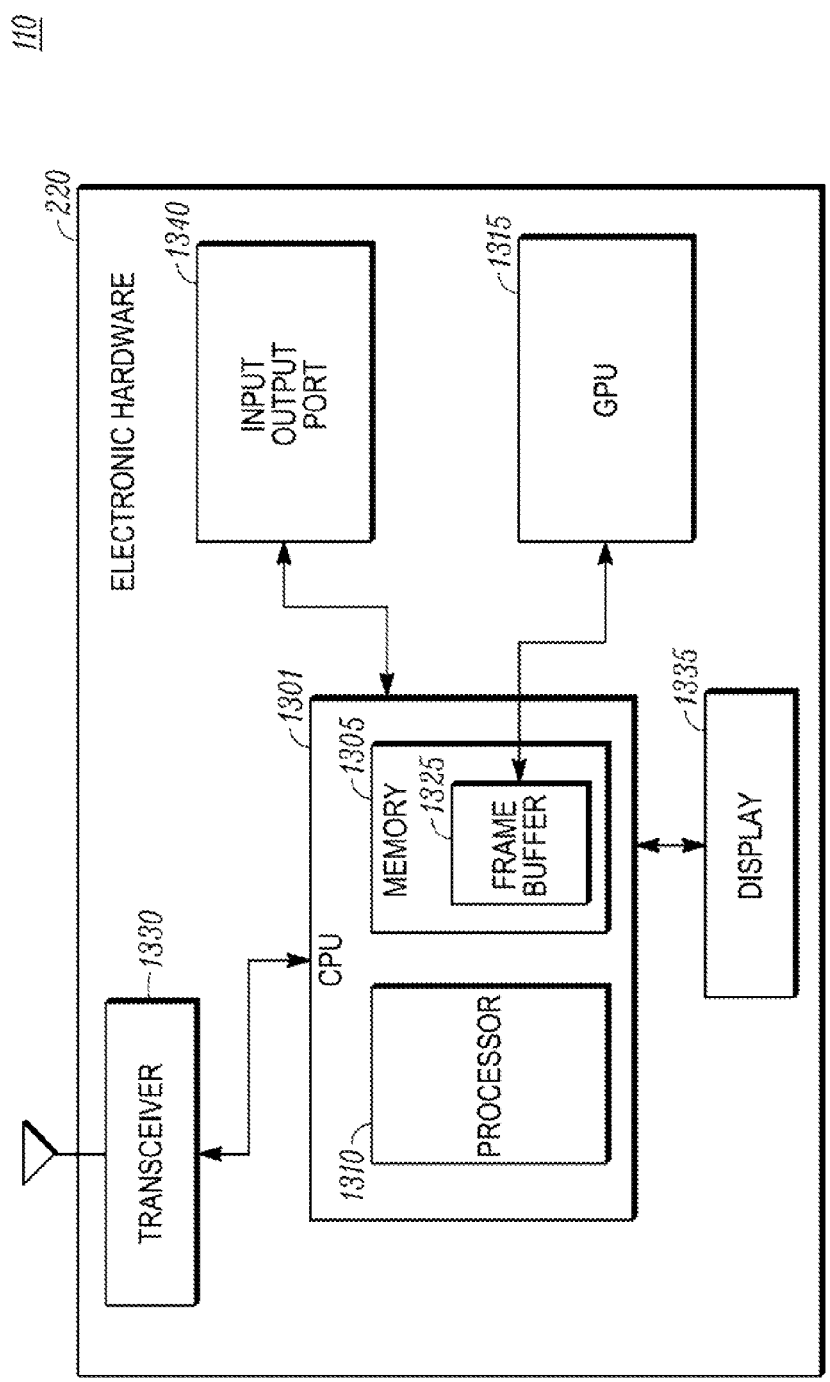
FIG. 13 is a block diagram that shows some hardware blocks of the mobile device.

Referring to FIG. 13, a block diagram shows some hardware blocks of the mobile device 110, in accordance with some embodiments. Mobile device 110 preferably comprises device electronic hardware 220 that includes a central processing unit (CPU) 1301 comprising memory 1305 coupled to a processor 1310. Memory 1305 may comprise random access memory, flash memory, read only memory, disk memory, or any combination thereof. The mobile device also comprises physical hardware, such as a housing, which is not shown in FIG. 13. The memory 1305 stores computer executable instructions which are configured to perform various functions and operations, as described herein. In some embodiments the electronic hardware 220 may include a GPU 1315 that is a specialized chipset for rapidly rendering images. The GPU 1315 is typically given direct access to a portion of the memory 1305 that is reserved for a frame buffer 1320, which is used for storing a current image of the GUI desktop 318 in the form of pixel values. In certain embodiments of the hardware 220, there will be a second frame buffer in memory 1305 (not shown in FIG. 13). This may occur when there are two displays. This could occur in a situation in which a mobile device has two displays (e.g., a large tablet display one side that shows a desktop WIW similar to WIW 320 and a small display facing another direction that displays the first OSE window 118 or a second WIW). This could also occur when the WIW 320 is presented on external device 310 and the first OSE window 118 or a second WIW is presented on the mobile device 110 simultaneously. In certain embodiments, such as those in which the GUI 112 of the mobile device presents a WIW managed by the second OSE 224 to render the first OSE window 118, the WIW image boundary may be identical to the first OSE window 118 image boundary (i.e., titles and tabs may not be rendered when the WIW is rendered on the display 113 of the mobile device 110), such that WIW is not visibly distinguishable in the form generally described as a desktop.

The software environment 216 (FIG. 2) executed by central processing unit 1301 includes first operating system environment 222 and second operating system environment 224 that are each in communication with the single Linux kernel 218, which is also executed by the CPU 1301. The single Linux kernel 218 is also in communication with many items of the electronic hardware 220, which are coupled to the CPU 1301, of which a few examples are a transceiver 1330, a display 1335, and an input output port 1340. The electronic hardware 220 includes input-output ports, of which one is a port 1340 that can be used to couple the mobile device 110 to the external device 310. This port 1340 can be an HDMI cable port or other type of cable (wired) port that is compatible with the video requirements of the external device 310. In some embodiments, it can be a wireless port that can couple an analog or digital video signal to the external device 310. Both a wired and a wireless port may be provided. In some embodiments, a docking station connector may be included in the electronic hardware 220. The processor 1310 may be a processor having multiple cores, or may be a reduced instruction set processor, or other type of processor.

While the invention has been particularly shown and described with reference to a particular embodiment, it will be understood by those skilled in the art that various changes in form and details may be made therein without departing from the spirit and scope of the invention. For example, the WIW 320 may be rendered on display 113 by the second OSE 224, when the external device 310 is not coupled to the mobile device 110 or is coupled to the mobile device 110 and is also rendering the WIW, or when the external device 310 is coupled to the mobile device 110 but is inactive. It is specifically intended that the present invention not be limited to the embodiments and illustrations contained herein, but include modified forms of those embodiments including portions of the embodiments and combinations of elements of different embodiments as come within the scope of the following claims.

The processes illustrated in this document, for example (but not limited to) the method steps described in FIGS. 7-12, may be performed using programmed instructions contained on a computer readable medium which may be read by processor of a CPU such as processor 1310 of CPU 1301. A computer readable medium may be any tangible medium capable of storing instructions to be performed by a microprocessor. The memory 1305 includes such a medium. The medium may be one of or include one or more of a CD disc, DVD disc, magnetic or optical disc, tape, and silicon based removable or non-removable memory. The programming instructions may also be carried in the form of packetized or non-packetized wireline or wireless transmission signals.

The invention claimed is:

1. A method of rendering a window comprising:
executing a first operating system environment (OSE) in a native mode on a central processing unit (CPU) of a mobile device, wherein the mobile device comprises a first graphical user interface (GUI), and wherein the first OSE generates graphical data for a first window, and wherein the first window can be used on the first GUI for interfacing with the first OSE;
executing, independent of the first OSE, a second OSE in a native mode on the CPU of the mobile device, wherein the second OSE generates a GUI desktop that is displayed on a second GUI; and
rendering on the GUI desktop a second window that comprises the first window, wherein the rendering comprises:
communicating relevant events from the second OSE to the first OSE via an inter-environment communication path, the inter-environment communication path comprising a communication module which resides within the second OSE and which is configured as a communication link between the first OSE and the second OSE;
modifying by the first OSE the graphical data of the first window in response to one or more of the relevant events;
determining, based on a communication from the first OSE to the second OSE via the inter-environment communication path, that a frame buffer of the first window has been updated, the frame buffer corresponding to the graphical data;
copying, in response to the communication from the first OSE to the second OSE, the frame buffer for the second window; and
providing for display the modified graphical data.

2. The method according to claim 1, further comprising initializing the second window by commands of the second OSE that perform the following:
creating a pixmap corresponding to the first OSE in the second window;
getting a memory handle for this pixmap;
creating and initialize a surface using the memory handle;
creating a graphics interface image from the pixmap; and
binding a texture to the graphics interface image.

3. The method according to claim 1, further comprising initializing the second window by commands of the second OSE that perform the following:
initializing a desktop of the second GUI;
defining a buffer to receive the graphical data of the first window, wherein the buffer is bound to the second window located on the desktop; and
providing information to the first OSE that allows graphical data to be written into the buffer.

4. The method according to claim 3, further comprising rendering the second window by commands of the first OSE that perform the following:
writing the graphical data into the buffer; and
notifying the second OSE to update the desktop of the second GUI using the graphical data in the buffer.

5. The method according to claim 1, wherein the first window is a full screen window for the mobile device when rendered on the first GUI by the first OSE.

6. The method according to claim 1, wherein the relevant events comprise user inputs that occur within a region of the second window when the second window is in focus and global input events relevant to one of the first OSE and first OSE applications.

7. The method according to claim 1, further comprising modifying by the second OSE the graphical data generated by the first OSE, wherein the modification by the second OSE is restricted to scaling the graphical data.

8. The method according to claim 1, wherein the first OSE comprises an Android™ operating system environment and the second operating system environment comprises an Ubuntu® operating system environment.

9. The method according to claim 1, wherein the second GUI comprises one of the first GUI, a second display of the mobile device, and a GUI of an external device.

10. An apparatus comprising:
a central processing unit (CPU);
a first graphical user interface (GUI); and
a second GUI, wherein the CPU:
executes a first operating system environment (OSE) in a native mode on the CPU of the apparatus, wherein the apparatus comprises the first GUI, and wherein the first OSE generates graphical data for a first window, and wherein the first window can be used on the first GUI for interfacing with the first OSE, and
executes, independent of the first OSE, a second OSE in a native mode on the CPU of the apparatus, wherein the second OSE generates a desktop that is displayed on a second GUI, and renders on the GUI desktop a second window that comprises the first window, wherein the rendering comprises communicating relevant events from the second OSE to the first OSE via an inter-environment communication path, modifying, by the first OSE, the graphical data of the first window in response to one or more of the relevant events, the inter-environment communication path comprising a communication module which resides within the second OSE and is configured as a communication link between the first OSE and the second OSE, determining, based on a communication from the first OSE to the second OSE via the inter-environment communication path, that a frame buffer of the first window has been updated, the frame buffer corresponding to the graphical data, copying, in response to the communication from the first OSE to the second OSE, the frame buffer for the second window, and providing for display the modified graphical data.

11. A non-transitory computer readable memory that stores instructions that are executable by a processor for performing a method of rendering a window that comprises:
executing a first operating system environment (OSE) in a native mode on a central processing unit (CPU) of a mobile device, wherein the mobile device comprises a first graphical user interface (GUI), and wherein the first OSE generates graphical data for a first window, and wherein the first window can be used on the first GUI for interfacing with the first OSE;
executing, independent of the first OSE, a second operating system environment (second OSE) in a native mode on the CPU of the mobile device, wherein the second OSE generates a desktop that is displayed on a second GUI; and
rendering on the GUI desktop a second window that comprises the first window, wherein the rendering comprises:
communicating relevant events from the second OSE to the first via an inter-environment communication path, the inter-environment communication path comprising a communication module which resides within the second OSE and is configured as a communication link between the first OSE and the second OSE; and modifying by the first OSE the graphical data of the first window in response to one or more of the relevant events, determining, based on a communication from the first OSE to the second OSE via the inter-environment communication path, that a frame buffer of the first window has been updated;

copying, in response to the communication from the first OSE to the second OSE, the frame buffer for the second window; and providing for display the modified graphical data.

12. The computer readable memory according to claim 11, wherein the relevant events comprise user inputs that occur within a region of the second window when the second window is in focus and global input events relevant to one of the first OSE and first OSE applications.

13. The computer readable memory according to claim 11, the method further comprising initializing the second window by commands of the second OSE that perform the following:

creating a pixmap corresponding to the first OSE in the second window;

getting a memory handle for this pixmap;

creating and initialize a surface using the memory handle;

creating a graphics interface image from the pixmap; and binding a texture to the graphics interface image.

14. The computer readable memory according to claim 11, the method further comprising initializing the second window by commands of the second OSE that perform the following:

initializing a desktop of the second GUI;

defining a buffer to receive graphical data of the first window, wherein the buffer is bound to a second window located on the desktop; and providing information to the first OSE that allows graphical data to be written into the buffer.

15. The computer readable memory according to claim 14, the method further comprising rendering the second window by commands of the first OSE that perform the following:

writing the graphical data into the buffer; and notifying the second OSE to update the desktop of the second GUI using the graphical data in the buffer.

16. The computer readable memory according to claim 11, the method further comprising modifying by the second OSE the graphical data generated by the first OSE, wherein the modification by the second OSE is restricted to scaling the graphical data.

17. The method according to claim 1, wherein the communication module comprises a DBUS Daemon.

18. The method according to claim 17, wherein the inter-environment communication path comprises a first DBUS library, residing at the first OSE, for interfacing with the DBUS Daemon, and a second DBUS library, residing at the second OSE, for interfacing with the DBUS Daemon.

* * * * *